(12) United States Patent
Wakimoto et al.

(10) Patent No.: US 10,113,214 B2
(45) Date of Patent: Oct. 30, 2018

(54) ALKALI METAL AND/OR ALKALI EARTH METAL EXTRACTION METHOD

(71) Applicants: AISIN SEIKI KABUSHIKI KAISHA, Kariya-shi (JP); THE UNIVERSITY OF TOKYO, Bunkyo-ku (JP)

(72) Inventors: Yoshiki Wakimoto, Toyota (JP); Satoshi Fujii, Nogoya (JP); Yukinori Ryonaga, Okazaki (JP); Kiichiro Amano, Kakamigahara (JP); Toshiya Kojima, Seto (JP); Shu Yamaguchi, Bunkyo-ku (JP); Shogo Miyoshi, Bunkyo-ku (JP)

(73) Assignees: AISIN SEIKI KABUSHIKI KAISHA, Kariya-shi (JP); THE UNIVERSITY OF TOKYO, Bunkyo-ku (JP)

( * ) Notice: Subject to any disclaimer, the term of this patent is extended or adjusted under 35 U.S.C. 154(b) by 0 days.

(21) Appl. No.: 14/412,267

(22) PCT Filed: Jul. 4, 2013

(86) PCT No.: PCT/JP2013/068377
§ 371 (c)(1),
(2) Date: Dec. 31, 2014

(87) PCT Pub. No.: WO2014/007332
PCT Pub. Date: Jan. 9, 2014

(65) Prior Publication Data
US 2015/0167118 A1 Jun. 18, 2015

(30) Foreign Application Priority Data
Jul. 5, 2012 (JP) .................. 2012-151744

(51) Int. Cl.
*C22B 7/00* (2006.01)
*C22B 26/00* (2006.01)
(Continued)

(52) U.S. Cl.
CPC .......... *C22B 7/007* (2013.01); *B01D 11/0257* (2013.01); *B01D 11/0288* (2013.01);
(Continued)

(58) Field of Classification Search
CPC .......... C22B 7/007; C22B 26/10; C22B 26/20; B01D 11/0288
See application file for complete search history.

(56) References Cited

U.S. PATENT DOCUMENTS

2015/0322547 A1* 11/2015 Wakimoto ............. B01D 11/02
423/155

FOREIGN PATENT DOCUMENTS

| CN | 101293663 | 10/2008 |
|---|---|---|
| CN | 101993104 | 3/2011 |

(Continued)

OTHER PUBLICATIONS

Zhang et al. CN 102398910A published Apr. 2012. Machine translation.*

(Continued)

*Primary Examiner* — George Wyszomierski
*Assistant Examiner* — Tima M McGuthry-Banks
(74) *Attorney, Agent, or Firm* — Oblon, McClelland, Maier & Neustadt, L.L.P.

(57) ABSTRACT

The present invention provides an alkali metal and/or alkali earth metal extraction method that has excellent extraction efficiency and allows repeated use of an aqueous solution that extracts an alkali metal and/or alkali earth metal from a solid. The alkali metal and/or alkali earth metal extraction method is a method for extracting an alkali metal and/or alkali earth metal from a solid containing the alkali metal and/or alkali earth metal, the method including an elution step in which the solid is added to a neutral amino acid-containing aqueous solution or an amino acid-containing (Continued)

mixed aqueous solution produced by mixing a pH adjusting agent with an aqueous solution containing at least one of a neutral amino acid, an acidic amino acid and a basic amino acid so as to elute the alkali metal and/or alkali earth metal in the neutral amino acid-containing aqueous solution or the amino acid-containing mixed aqueous solution.

6 Claims, 11 Drawing Sheets

(51) Int. Cl.
*B01D 11/02* (2006.01)
*C01F 11/18* (2006.01)
*B09B 3/00* (2006.01)
*C22B 26/10* (2006.01)
*C22B 26/20* (2006.01)
*C01F 5/24* (2006.01)

(52) U.S. Cl.
CPC .............. *B09B 3/0016* (2013.01); *C01F 5/24* (2013.01); *C01F 11/18* (2013.01); *C22B 26/00* (2013.01); *C22B 26/10* (2013.01); *C22B 26/20* (2013.01)

(56) References Cited

FOREIGN PATENT DOCUMENTS

| CN | 101293663 B | * | 5/2011 |
|---|---|---|---|
| CN | 102398910 A | * | 4/2012 |
| JP | 57-042532 | | 3/1982 |
| JP | 62-001832 | | 1/1987 |
| JP | 2000-154996 | | 6/2000 |
| JP | 2001-121188 | | 5/2001 |
| JP | 2003-159583 | | 6/2003 |
| JP | 2005-097072 | | 4/2005 |
| JP | 2005-219013 | | 8/2005 |
| JP | 2006-069860 | | 3/2006 |
| JP | 2007-056308 | | 3/2007 |
| JP | 2007-222713 | | 9/2007 |
| JP | 2007-314359 A | | 12/2007 |
| JP | 2009-136770 | | 6/2009 |
| JP | 2011-212534 A | | 10/2011 |
| WO | WO 00/03949 A1 | | 1/2000 |
| WO | WO 2011/040231 A1 | | 4/2011 |

OTHER PUBLICATIONS

Fujii et al. WO 2011040231 published May 2011. Machine translation of corresponding document EP 2484634 A.*
Derwent Acc No. 2012-E35787. Patent family including CN 102398910A published Apr. 2012 by Su et al. Abstract.*
Derwent Acc No. 2011-D69891. Patent family including WO 2011040231 A1 published Apr. 2011 by Fujii et al. Abstract.*
Yingwu Yin et al. CN 101993104 published Mar. 2011. machine translation.*
CN 101993104A, human translation. (Year: 2011).*
CN 101293663 B. Machine translation of the description. (Year: 2011).*
English translation of the International Preliminary Report on Patentability and Written Opinion of the International Search Authority dated Jan. 15, 2015 in PCT/JP2013/068377.
International Search Report dated Sep. 17, 2013 in PCT/JP13/068377 filed Jul. 4, 2013.
Extended European Search Report dated May 26, 2015 in Patent Application No. 13813289.9.
Japanese Office Action dated May 31, 2016 in Patent Application No. 2014-523787 (with English Translation).

* cited by examiner

Fig.3

| Various types of amino acids | Solid | Molar ratio | Weight of solid (g) | Weight of amino acid (g) |
|---|---|---|---|---|
| L-proline | Cement | 1:0.1 | 2.401 | 0.315 |
| | | 1:1 | 2.401 | 3.164 |
| | Slag | 1:0.1 | 3.660 | 0.317 |
| | | 1:1 | 3.661 | 3.164 |
| L-alanine | Cement | 1:0.1 | 2.401 | 0.246 |
| | | 1:1 | 2.400 | 2.449 |
| | Slag | 1:0.1 | 3.659 | 0.244 |
| | | 1:1 | 3.661 | 2.448 |
| L-cysteine | Cement | 1:0.1 | 2.400 | 0.334 |
| | | 1:1 | 2.400 | 3.329 |
| | Slag | 1:0.1 | 3.661 | 0.333 |
| | | 1:1 | 3.661 | 3.330 |
| L-isoleucine | Cement | 1:0.1 | 2.400 | 0.362 |
| | | 1:1 | 2.401 | 3.605 |
| | Slag | 1:0.1 | 3.661 | 0.361 |
| | | 1:1 | 3.661 | 3.605 |
| DL-alanine | Cement | 1:0.1 | 2.400 | 0.245 |
| | | 1:1 | 2.401 | 2.449 |
| | Slag | 1:0.1 | 3.661 | 0.244 |
| | | 1:1 | 3.660 | 2.449 |
| L-leucine | Cement | 1:0.1 | 2.399 | 0.361 |
| | | 1:1 | 2.398 | 3.602 |
| | Slag | 1:0.1 | 3.595 | 0.361 |
| | | 1:1 | 3.599 | 3.606 |
| L-valine | Cement | 1:0.1 | 2.392 | 0.319 |
| | | 1:1 | 2.407 | 3.219 |
| | Slag | 1:0.1 | 3.592 | 0.318 |
| | | 1:1 | 3.593 | 3.218 |
| L-(-)-threonine | Cement | 1:0.1 | 2.397 | 0.326 |
| | | 1:1 | 2.401 | 3.267 |
| | Slag | 1:0.1 | 3.606 | 0.335 |
| | | 1:1 | 3.587 | 3.277 |
| L-tryptophan | Cement | 1:0.1 | 2.402 | 0.561 |
| | | 1:1 | 2.407 | 5.616 |
| | Slag | 1:0.1 | 3.597 | 0.567 |
| | | 1:1 | 3.602 | 5.612 |

Fig.4

| Various types of amino acids | Solid | Molar ratio | Weight of solid (g) | Weight of amino acid (g) |
|---|---|---|---|---|
| L-methionine | Cement | 1:0.1 | 2.401 | 0.407 |
| | | 1:1 | 2.396 | 4.101 |
| | Slag | 1:0.1 | 3.594 | 0.404 |
| | | 1:1 | 3.601 | 4.107 |
| L-phenylalanine | Cement | 1:0.1 | 2.398 | 0.456 |
| | | 1:1 | 2.392 | 4.533 |
| | Slag | 1:0.1 | 3.607 | 0.449 |
| | | 1:1 | 3.603 | 4.536 |
| L-asparagine hydrate | Cement | 1:0.1 | 2.395 | 0.415 |
| | | 1:1 | 2.396 | 4.125 |
| | Slag | 1:0.1 | 3.597 | 0.410 |
| | | 1:1 | 3.593 | 4.217 |
| L-(−)-tyrosine | Cement | 1:0.1 | 2.402 | 0.504 |
| | | 1:1 | 2.398 | 4.973 |
| | Slag | 1:0.1 | 3.593 | 0.496 |
| | | 1:1 | 3.592 | 4.966 |
| Glycine | Cement | 1:0.1 | 2.400 | 0.212 |
| | | 1:1 | 2.398 | 2.072 |
| | Slag | 1:0.1 | 3.597 | 0.209 |
| | | 1:1 | 3.593 | 2.069 |
| L-serine | Cement | 1:0.1 | 2.387 | 0.285 |
| | | 1:1 | 2.395 | 2.887 |
| | Slag | 1:0.1 | 3.596 | 0.293 |
| | | 1:1 | 3.600 | 2.887 |
| N-acetyl-D-glucosamine | Cement | 1:0.1 | 2.396 | 0.605 |
| | | 1:1 | 2.397 | 6.083 |
| | Slag | 1:0.1 | 3.598 | 0.608 |
| | | 1:1 | 3.603 | 6.078 |
| D-glucosamic acid | Cement | 1:0.1 | 2.394 | 0.542 |
| | | 1:1 | 2.403 | 5.366 |
| | Slag | 1:0.1 | 3.597 | 0.538 |
| | | 1:1 | 3.598 | 5.369 |

Fig.15

| Various types of amino acids | Solid | Molar ratio | Isoelectric point | Converted concentration of Ca eluted in saturated aqueous solution (mol/L) | Solid | Molar ratio | Isoelectric point | Converted concentration of Ca eluted in saturated aqueous solution (mol/L) |
|---|---|---|---|---|---|---|---|---|
| L-aspartic acid | Cement | 1:1 | 2.98 | 2.19E-01 | Slag | 1:1 | 2.98 | 9.09E-02 |
| L-glutamic acid | Cement | 1:1 | 3.29 | 4.83E-01 | Slag | 1:1 | 3.29 | 2.07E-01 |
| L-cysteine | Cement | 1:1 | 5.11 | 4.61E+00 | Slag | 1:1 | 5.11 | 1.03E+00 |
| L-alanine | Cement | 1:1 | 6.12 | 3.02E+01 | Slag | 1:1 | 6.12 | 7.61E+00 |
| DL-alanine | Cement | 1:1 | 6.12 | 3.70E+01 | Slag | 1:1 | 6.12 | 7.73E+00 |
| L-proline | Cement | 1:1 | 6.24 | 3.24E+01 | Slag | 1:1 | 6.24 | 7.36E+00 |
| Glycine | Cement | 1:1 | 6.13 | 5.80E+00 | Slag | 1:1 | 6.13 | 1.12E+00 |
| L-arginine | Cement | 1:1 | 10.76 | 4.17E-01 | Slag | 1:1 | 10.76 | 1.99E-01 |

ALKALI METAL AND/OR ALKALI EARTH METAL EXTRACTION METHOD

TECHNICAL FIELD

The present invention relates to a method for extracting an alkali metal and/or alkali earth metal from a solid containing the alkali metal and/or alkali earth metal.

BACKGROUND ART

As a conventional method for extracting an alkali metal and/or alkali earth metal from a solid containing the alkali metal and/or alkali earth metal, for example, the method disclosed in Patent Document 1 is known. Patent Document 1 discloses a method in which magnesium and calcium are extracted from steel slag or the like by adding steel slag or the like to an aqueous solution containing formic acid or citric acid so as to elute magnesium and calcium, and thereafter injecting carbonic acid gas to the aqueous solution so as to precipitate out as carbonates (magnesium carbonate and calcium carbonate).

CITATION LIST

Patent Literature

Patent Document 1: JP 2007-222713 A (see the claims)

SUMMARY OF INVENTION

Technical Problem

However, the use of an aqueous solution containing formic acid or citric acid as disclosed in Patent Document 1 significantly reduces the extraction capability of extracting magnesium and calcium if the dissolution of magnesium and calcium and the injection of carbonic acid gas are repeated. Accordingly, Patent Document 1 is problematic in that the aqueous solution cannot be used repeatedly, which increases the cost.

It is an object of the present invention to provide an alkali metal and/or alkali earth metal extraction method that has excellent extraction efficiency and allows repeated use of an aqueous solution for extracting an alkali metal and/or alkali earth metal from a solid.

Solution to Problem

The present inventors found that the use of an amino acid-containing aqueous solution when extracting an alkali metal and/or alkali earth metal from a solid makes it difficult to cause the reduction of extraction capability even if the amino acid-containing aqueous solution is repeatedly used, and arrived at the present invention. This is because the combination of an amino acid and an alkali metal and/or alkali earth metal promotes the occurrence of chelate reaction, and the injection of an acidic gas separates and restores the amino acid.

A characteristic configuration of a method for extracting an alkali metal and/or alkali earth metal according to the present invention lies in a method for extracting an alkali metal and/or alkali earth metal from a solid containing the alkali metal and/or alkali earth metal, the method comprising an elution step in which the solid is added to a neutral amino acid-containing aqueous solution so as to elute the alkali metal and/or alkali earth metal in the neutral amino acid-containing aqueous solution.

According to this configuration, the introduction of the solid to a neutral amino acid-containing aqueous solution causes the carboxyl group and the amino group that are contained in the neutral amino acid to react with the alkali metal and/or alkali earth metal so as to form a chelated complex, and the alkali metal and/or alkali earth metal are eluted from the solid. The neutral amino acid-containing aqueous solution in particular has a high saturated solubility in water, and thus the chelate reaction can be promoted by increasing the concentration of amino acid in the solution, and the elution capability of eluting an alkali metal and/or alkali earth metal can be increased. Accordingly, more amount of alkali metal and/or alkali earth metal can be eluted from the solid, and solid residues such as, for example, industrial waste matter can be efficiently reduced.

Another characteristic configuration lies in a method for extracting an alkali metal and/or alkali earth metal from a solid containing the alkali metal and/or alkali earth metal, the method comprising an elution step in which the solid is added to an amino acid-containing mixed aqueous solution produced by mixing a pH adjusting agent with an aqueous solution containing at least one of a neutral amino acid, an acidic amino acid and a basic amino acid so as to elute the alkali metal and/or alkali earth metal in the amino acid-containing mixed aqueous solution.

According to this configuration, it is possible to produce an amino acid-containing mixed aqueous solution having an isoelectric point near neutral pH by mixing a pH adjusting agent with an aqueous solution containing at least one of a neutral amino acid, an acidic amino acid and a basic amino acid. The amino acid-containing mixed aqueous solution having an isoelectric point near neutral pH has a high saturated solubility in water, and thus the chelate reaction can be promoted by increasing the concentration of amino acid in the solution, and the elution capability of eluting an alkali metal and/or alkali earth metal can be increased. Accordingly, more amount of alkali metal and/or alkali earth metal can be eluted from the solid, and solid residues such as, for example, industrial waste matter can be efficiently reduced.

Another characteristic configuration lies in that the method includes, after the elution step, a precipitation step in which the neutral amino acid-containing aqueous solution or the amino acid-containing mixed aqueous solution is brought into contact with an acidic gas so as to precipitate the alkali metal and/or alkali earth metal as a salt, and a recovery step in which the salt is recovered.

According to this configuration, with a simple operation of bringing the aqueous solution into contact with an acidic gas, it is possible to efficiently recover the alkali metal and/or alkali earth metal eluted in the elution step as a salt.

Another characteristic configuration lies in that the neutral amino acid-containing aqueous solution or the amino acid-containing mixed aqueous solution has an isoelectric point within a range of ±1.5 with respect to a first acid dissociation constant of the acidic gas.

The acidic gas can have a desired buffer capacity within a range of ±1.5 with respect to the first acid dissociation constant. According to this configuration, when the chelated complex is brought into contact with an acidic gas, the isoelectric point of the neutral amino acid-containing aqueous solution or the amino acid-containing mixed aqueous solution is within a range of ±1.5 with respect to the first acid dissociation constant of the acidic gas, and thus the range of the buffer capacity of the acidic gas and the range of the buffer capacity of the amino acid overlap with each other, which promotes the precipitation of salt and the separation and restoration of the amino acid. Accordingly, with the high precipitation capability of precipitating a salt in addition to the high elution capability of eluting an alkali metal and/or alkali earth metal, solid residues can be further reduced.

Also, it is preferable that the acidic gas is carbonic acid gas. Because the range of the buffer capacity of the carbonic acid gas and the range of the buffer capacity of the amino acid overlap with each other, the amount of consumption of the carbonic acid gas increases as the precipitation of salt is promoted. That is, the amount of carbon dioxide, which is a greenhouse gas, can be reduced along with the reduction of solid residues, and thus the present invention is effective.

Another characteristic configuration lies in that the method includes a second elution step in which another solid containing an alkali metal and/or alkali earth metal is added to the neutral amino acid-containing aqueous solution or the amino acid-containing mixed aqueous solution that has undergone the recovery step so as to elute the alkali metal and/or alkali earth metal in the neutral amino acid-containing aqueous solution or the amino acid-containing mixed aqueous solution.

According to this configuration, the neutral amino acid-containing aqueous solution or the amino acid-containing mixed aqueous solution after a single use can be used again, and it is also possible to carry out extraction processing of extracting an alkali metal and/or alkali earth metal from another solid, and thus the configuration is convenient. In particular, the neutral amino acid-containing aqueous solution or the amino acid-containing mixed aqueous solution can be used repeatedly with the addition of an acidic gas because the separation/restoration capability of amino acid from the chelated complex is high.

BRIEF DESCRIPTION OF DRAWINGS

FIG. 3 is a table showing the amounts of various types of amino acids, cement and slag used in Example 1.

FIG. 4 is a table showing the amounts of various types of amino acids, cement and slag used in Example 1.

FIG. 15 is a table showing a relationship between the isoelectric point of an amino acid and the amount (moVL) of elution of calcium ions according to Example 3.

DESCRIPTION OF EMBODIMENTS

[Embodiment]

Figure 1:
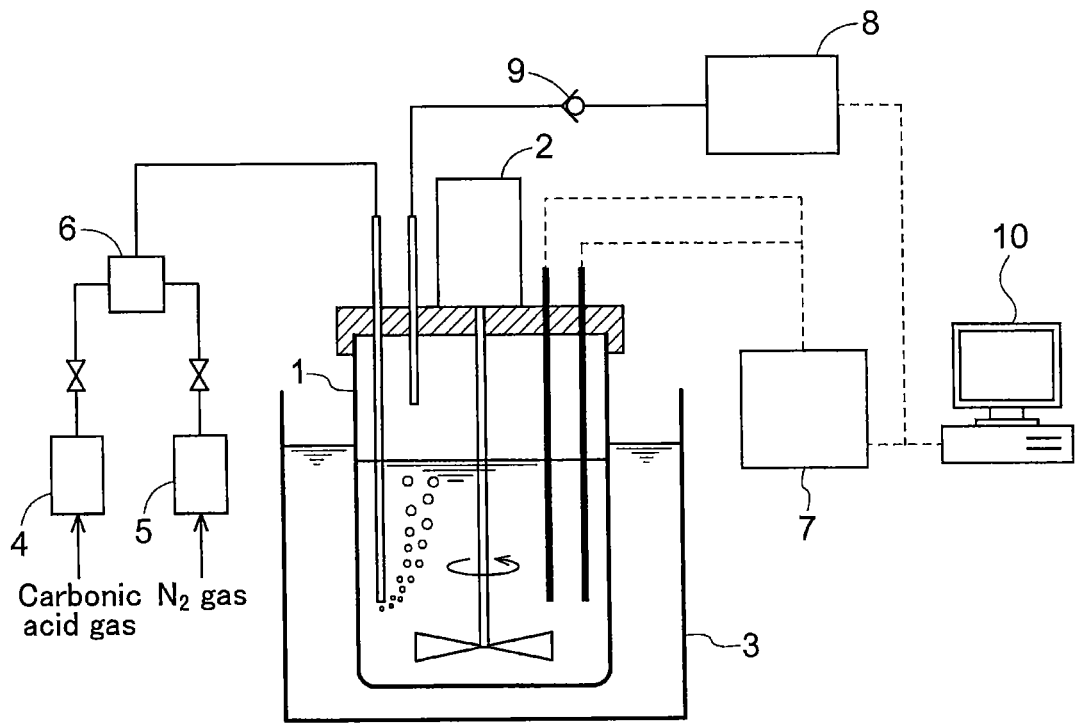
FIG. 1 is a schematic diagram of an apparatus used in examples.

Hereinafter, an embodiment of the present invention will be described. An alkali metal and/or alkali earth metal extraction method according to the present invention includes an elution step in which a solid containing an alkali metal and/or alkali earth metal is added to a neutral amino acid-containing aqueous solution containing a neutral amino acid or an amino acid-containing mixed aqueous solution produced by mixing a pH adjusting agent with an aqueous solution containing at least one of a neutral amino acid, an acidic amino acid and a basic amino acid so as to elute the alkali metal and/or alkali earth metal in the neutral amino acid-containing aqueous solution or the amino acid-containing mixed aqueous solution.

(Solid)

Solid as used in the present invention refers to a solid containing at least one selected from the group consisting of alkali metals such as lithium, sodium, potassium, rubidium and cesium, and alkali earth metals such as magnesium, calcium, strontium, barium and radium. The solid can be, for example, a natural mineral, a waste material, a by-product discharged from a production process, or the like.

The natural mineral can be, for example, any one of carbonates, phosphates, silicates, aluminates, sulfates, hydroxides, chlorides and the like of alkali metals or a hydrate thereof, or any one of carbonates, phosphates, silicates, aluminates, sulfates, hydroxides, chlorides and the like of alkali earth metals or a hydrate thereof. Specific examples of the natural mineral include a rock composed mainly of at least one selected from the group consisting of calcium silicate, sodium silicate, sodium phosphate, magnesium silicate, calcium phosphate, magnesium phosphate, calcium aluminate and magnesium aluminate, a weathered product of such a rock, and the pulverized form of such a rock.

Specific examples of the waste material or the by-product discharged from a production process include a concrete solidified with a solid hydrated cement, a construction waste material containing such a concrete, a pulverized form of such a concrete, by-products discharged from a steelmaking process such as steel slag, cupola slag, soda lime glass and potash lime glass, fly ash or molten slag thereof generated during incineration of waste matter, paper sludge generated during a papermaking process, municipal waste, sludge, and the like.

The solid used in the present invention is preferably pulverized to a particle size of approximately 1 μm to 100 μm because the alkali metal and/or alkali earth metal can be easily eluted.

(Neutral Amino Acid-Containing Aqueous Solution)

A neutral amino acid-containing aqueous solution as used in the present invention refers to an aqueous solution containing at least a predetermined amount of neutral amino acid. The aqueous solution may further contain, if necessary, in addition to the neutral amino acid, a basic amino acid or an acidic amino acid, or may further contain a known additive and the like that are usually used to stabilize the solution. In the case where a basic amino acid or/and an acidic amino acid are mixed with the neutral amino acid, the neutral amino acid-containing aqueous solution preferably has an isoelectric point near neutral pH (pH=about 4 to 8).

As used herein, neutral amino acid refers to an organic compound that has two functional groups: an amino group and a carboxyl group, and has an isoelectric point at a pH of about 5 to 7. To be specific, examples of the neutral amino acid include isoleucine, leucine, valine, threonine, tryptophan, methionine, phenylalanine, asparagine, cysteine, tyrosine, alanine, glucosamine, glycine, proline and serine that are contained in the proteins of organisms, but it is particularly preferable to use alanine as the neutral amino acid in order to more repeatedly use the neutral amino acid-containing aqueous solution in a stable manner. Basic amino acid refers to an organic compound that has two or more amino groups and has an isoelectric point on the alkaline side. Specific examples of the basic amino acid include lysine, arginine and histidine that are contained in the proteins of organisms. Acidic amino acid refers to an amino acid that has two carboxyl groups and has an isoelectric point on the acid side. Examples of the acidic amino acid include glutamic acid and aspartic acid. The acidic amino acid is not limited to the amino acids listed above, and it is also possible to use an N protected amino acid such as N-acetyl-D-glucosamine or a C protected amino acid.

(Amino Acid-Containing Mixed Aqueous Solution)

An amino acid-containing mixed aqueous solution as used in the present invention refers to an aqueous solution having an isoelectric point near neutral pH (pH=about 4 to 8) by mixing a pH adjusting agent with an aqueous solution containing a predetermined amount of at least one of a neutral amino acid, an acidic amino acid and a basic amino acid. There is no particular limitation on the pH adjusting agent, and a basic amino acid may be mixed with an acidic amino acid. Alternatively, for example, sodium hydroxide or potassium hydroxide may be mixed. If necessary, a known additive and the like that are usually used to stabilize the solution may be contained. Hereinafter, unless it is necessary to make a distinction, the neutral amino acid-containing aqueous solution and the amino acid-containing mixed aqueous solution are expressed as the neutral amino acid-containing aqueous solution or the like.

The amount of amino acid contained in the neutral amino acid-containing aqueous solution or the like depends on the amount of solid that is added to the neutral amino acid-containing aqueous solution or the like, and thus the operator can make adjustment as appropriate so that, for example, amino acid is added in an amount approximately 0.01 times or more the total moles of alkali metal and alkali earth metal contained in the solid. However, if the amount of solid is constant, the amino acid concentration is preferably higher. Also, the saturated solubility in water varies according to the type of amino acid, and the saturated solubility of neutral amino acid tends to be higher than that of acidic amino acid or basic amino acid. For this reason, various types of amino acids with which a neutral amino acid or a pH adjusting agent is mixed so as to have an isoelectric point near neutral pH are used to efficiently increase the concentration of amino acid contained in the aqueous solution.

In the elution step, first, a neutral amino acid-containing aqueous solution containing a predetermined amount of neutral amino acid, or an amino acid-containing mixed aqueous solution produced by mixing, for example, a predetermined amount of basic amino acid and a predetermined amount of acidic amino acid is prepared. Next, a solid containing an alkali metal and/or alkali earth metal is added to the prepared neutral amino acid-containing aqueous solution or the like, and the resulting mixture is then, for example, allowed to stand for a while or stirred/mixed by using a known stirrer so as to elute the alkali metal and/or alkali earth metal in the neutral amino acid-containing aqueous solution or the like.

To be specific, for example, the following elution reactions of calcium ions are assumed when cement serving as the solid is added to the neutral amino acid.

$$2HL + Ca(OH)_2 \rightarrow Ca(HL)_2^{2+} + 2OH^- \quad (1)$$

$$2HL + Ca(OH)_2 \rightarrow CaL_2 + 2H_2O \quad (2)$$

In the above formulas, L represents a ligand of the neutral amino acid.

As can be seen from (1) and (2) given above, the alkali metal and/or alkali earth metal contained in the solid causes a chelate reaction with the carboxyl group and amino group of the amino acid so as to produce a chelated complex ($Ca(HL)_2^{2+}$, $CaL_2$). At this time, hydroxide ions ($OH^-$) bonded to calcium ions ($Ca^{2+}$) are dissociated, and thus the aqueous solution shifts toward the alkaline side.

Various conditions for the elution step including the amount of neutral amino acid-containing aqueous solution or the like used, the standing time, the stirring speed of the stirrer, the temperature during stirring, the stirring time, and the like can be adjusted as appropriate by the operator. In the case where, for example, the elution step of eluting the solid is carried out by using a stirrer, it is preferable that the stirring speed of the stirrer is approximately 300 to 500 rpm, the temperature during stirring is approximately 10 to 70° C., and the stirring time is approximately 0.5 minutes or more.

Furthermore, the present invention may include, after the elution step, a precipitation step in which the neutral amino acid-containing aqueous solution or the like is brought into contact with an acidic gas so as to precipitate the alkali metal and/or alkali earth metal as a salt, and a recovery step in which the precipitated salt is recovered.

(Acidic Gas)

Examples of acidic gas that can be used in the present invention include $CO_2$, $NO_x$, $SO_x$, hydrogen sulfide and the like. In particular, $CO_2$ (carbonic acid gas) is not limited to pure carbonic acid gas, and any gas can be used as long as it contains carbonic acid gas. For example, a combustion exhaust gas generated by burning a gaseous fuel such as liquefied natural gas (LNG) or liquefied petroleum gas (LP), a liquid fuel such as gasoline or light oil, a solid fuel such as coal, or the like can be used as the carbonic acid gas.

There is no particular limitation on the method for bringing the neutral amino acid-containing aqueous solution or the like into contact with an acidic gas in the precipitation step, and any known method can be used. It is possible to use, for example, a method in which an acidic gas is bubbled (injected) into the neutral amino acid-containing aqueous solution or the like, a method in which the neutral amino acid-containing aqueous solution or the like and an acidic gas are contained in the same container and then shaken, or any other method. In the case where a combustion exhaust gas is used as the acidic gas, the combustion exhaust gas may be allowed to pass through an adsorbent filter or the like so as to remove dust and the like before it is brought into contact with the neutral amino add-containing aqueous solution or the like. The precipitation step can be carried out at an arbitrary temperature, but it is preferable to set the temperature to be 70° C. or lower because the acidic gas is more unlikely to be dissolved as the temperature becomes higher.

In the case where, for example, carbonic acid gas is used in the precipitation step, for example, calcium ions or magnesium ions of the alkali earth metal eluted from the solid react with the carbonic add to produce and precipitate a carbonate such as calcium carbonate or magnesium carbonate. To be specific, the following precipitation reactions occur when the aqueous solution that has undergone the elution reaction shown in (1) or (2) above is brought into contact with carbonic acid gas.

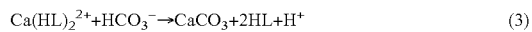

$$Ca(HL)_2^{2+} + HCO_3^- \rightarrow CaCO_3 + 2HL + H^+ \quad (3)$$

$$CaL_2 + HCO_3^- \rightarrow CaCO_3 + HL + L^- \quad (4)$$

When carbonic acid gas is injected into an aqueous solution containing a chelated complex in the precipitation step, an alkali metal and/or alkali earth metal is separated from the chelated complex so as to produce a carbonate, and a neutral amino acid and the like are separated from the chelated complex, and the state of the original neutral amino acid-containing aqueous solution or the like is restored. That is, the neutral amino acid and the like are useful because they function as a catalyst for separating an alkali metal and/or alkali earth metal from the solid and producing a carbonate, and can be used repeatedly.

It is known that the range in which an acidic gas can provide a desired buffer capacity is a range of ±1.5 with respect to the first acid dissociation constant. Accordingly, in the present invention, the isoelectric point of the neutral amino acid-containing aqueous solution or the like is preferably within a range of ±1.5 with respect to the first acid dissociation constant of the acidic gas. This is because the balance is achieved as a result of the range of the buffer capacity of the acidic gas (the left-side part of (3) and (4)) and the range of the buffer capacity of the amino acid that is restored (the right-side part of (3) and (4)) overlapping with each other, and the consumption of the acidic gas and the precipitation of the carbonate are promoted.

The first acid dissociation constant of the acidic gas is, in the case of carbonic acid gas, a pH when the following reaction occurs: $H_2CO_3 \rightarrow HCO_3^- + H^+$, and the pKa1 is 6.35. $H_2S$ or $H_2SO_3$ as the acidic gas has a pKa1 of about 6 to 7. Accordingly, for example, in the case where carbonic acid gas is used as the acidic gas, the isoelectric point of the neutral amino acid-containing aqueous solution or the like is preferably within a range of 4.75 to 7.85. As long as the range of the buffer capacity of the amino acid is within a range of ±1.5 from the isoelectric point, the amino acid can provide a certain level of buffer capacity, and thus it is sufficient that the isoelectric point of the neutral amino acid-containing aqueous solution or the like is within a range of about 4 to 8 such that the range of the buffer capacity of the acidic gas and the range of the buffer capacity of the amino acid overlap with each other.

The salt precipitated in the precipitation step can be recovered by a known method such as filtration in the subsequent recovery step. The recovered salt can be used as, for example, a filler in papermaking and the industries of pigment, paint, plastic, rubber, fabric, and the like.

Also, in the present invention, a second elution step may be carried out in which another solid containing an alkali metal and/or alkali earth metal is added to the neutral amino acid-containing aqueous solution or the like that has undergone the recovery step so as to elute the alkali metal and/or alkali earth metal in the neutral amino acid-containing aqueous solution or the like, and thereafter a second precipitation step and a second recovery step may also be carried out. In other words, in the present invention, it is possible to repeatedly carry out a series of processing steps including an elution step, a precipitation step and a recovery step on the same neutral amino acid-containing aqueous solution or the like by carrying out a second elution step, a second precipitation step and a second recovery step, thereafter a third elution step, a third precipitation step, and a third recovery step, and thereafter a fourth elution step, and so forth on the neutral amino acid-containing aqueous solution or the like used in a first elution step. At this time, there is no particular limitation on the solid that is added to the neutral amino acid-containing aqueous solution or the like, and the solid may be the same as that used in the previous elution step, or may be different.

EXAMPLES

Hereinafter, the present invention will be described in further detail by way of examples of the present invention. It is to be noted, however, that the present invention is not limited to the examples given below.

Example 1

An elution step according to the present invention was carried out by using an apparatus shown in FIG. 1 in order to confirm that an alkali metal and/or alkali earth metal can be extracted from a solid by using a neutral amino acid-containing aqueous solution. As shown in FIG. 1, the apparatus includes a reaction vessel 1, a stirrer 2, a water bath 3 for adjusting the temperature of the solution in the reaction vessel 1, flow regulators 4 and 5, a mixing apparatus 6, a measuring device 7, a gas chromatograph 8, a backflow preventing apparatus 9, and a calculator 10.

Figure 2:
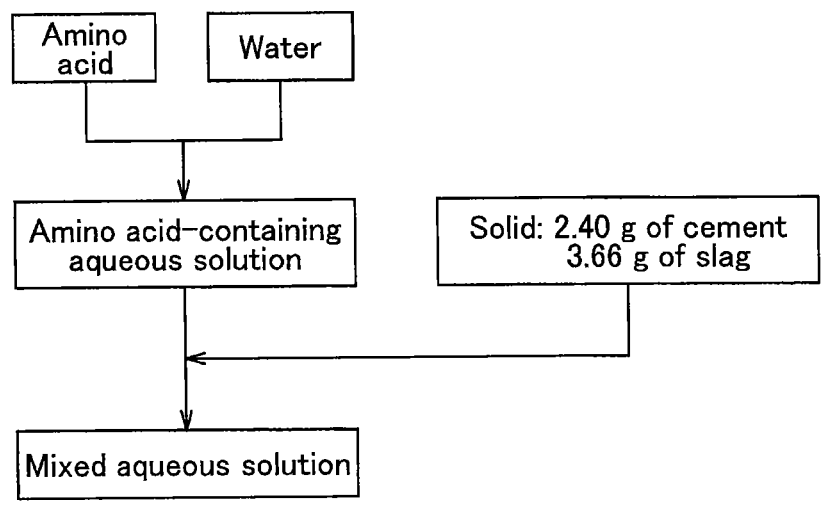
FIG. 2 is a flow diagram according to Example 1.

According to the flow shown in FIG. 2, a neutral amino acid-containing aqueous solution (100 mL) was prepared, and 2.40 g of cement (Portland cement for chemical analysis, the Japan Cement Association, 211 R reference sample for chemical analysis) or 3.66 g of slag (blast furnace slag reference material, the Japan Iron and Steel Federation, Standardization Center, blast furnace slag No. 6) was added as a solid so as to prepare a mixed aqueous solution. The amounts of calcium contained in the cement and the slag were 64.2 wt % and 42 wt %, respectively, on a CaO basis.

Seventeen different types of amino acids that were added, the weights thereof, the type and amount of solids added, and the molar ratio (the amount (mole) of substance of CaO in a solid : the amount (mole) of substance of an amino acid added) are shown in FIGS. 3 and 4. Also, the amount (mole) of substance of each of the various types of amino acids was set to 1 or 0.1 when the amount (mole) of substance of CaO contained in each of cement and slag was set to 1. That is, in this example, 68 different types of mixed aqueous solutions were prepared by changing the type of amino acid added, the type of solid added, and the molar ratio.

A neutral amino acid-containing aqueous solution in an amount of 100 mL was introduced into the reaction vessel 1, then a predetermined amount of solid was introduced so as to prepare a mixed aqueous solution, and the resulting mixed aqueous solution was stirred with the stirrer 2 at 400 rpm for 10 minutes so as to elute calcium ions (elution step). During the elution step, the pH, oxidation-reduction potential and temperature of the mixed aqueous solution in the reaction vessel 1 was measured by using the measuring device 7 so as to obtain the pH of each mixed aqueous solution and the rate of elution of calcium ions (the amount (mole) of substance of CaO in the mixed aqueous solution the amount (mole) of substance of CaO in the solid (cement or slag)× 100 (%)).

FIGS. 5 to 8 show the relationship between the pH of a mixed aqueous solution and the rate of elution of calcium ions immediately after introduction of a solid, and FIGS. 9 to 12 show the relationship between the pH of a mixed aqueous solution and the rate of elution of calcium ions measured 10 minutes after introduction of a solid.

Figure 5:
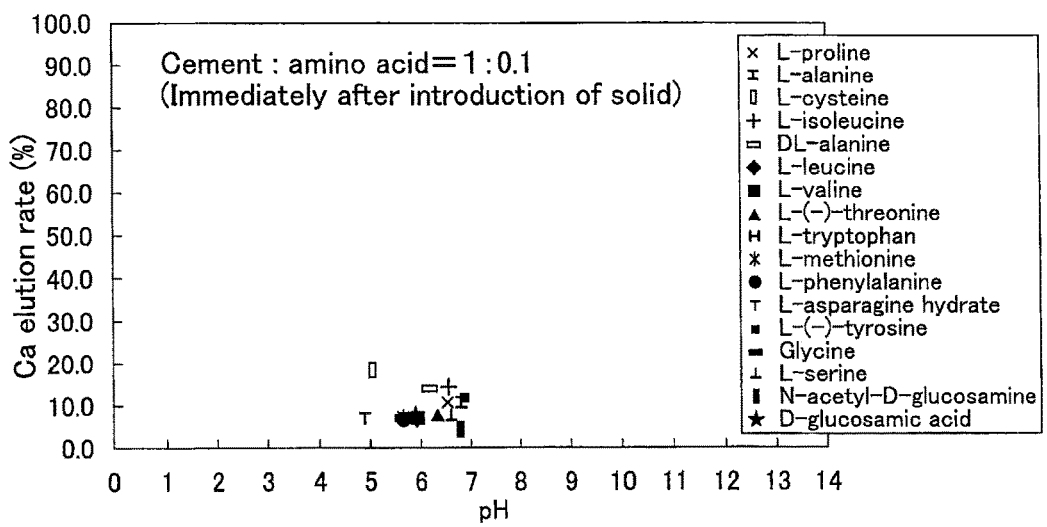
FIG. 5 is a diagram showing a relationship between the pH of a mixed aqueous solution and the rate of elution of calcium ions (the amount (mole) of substance of CaO in cement: the amount (mole) of substance of each of the various types of amino acids added=1:0.1) immediately after introduction of a solid.
Figure 9:
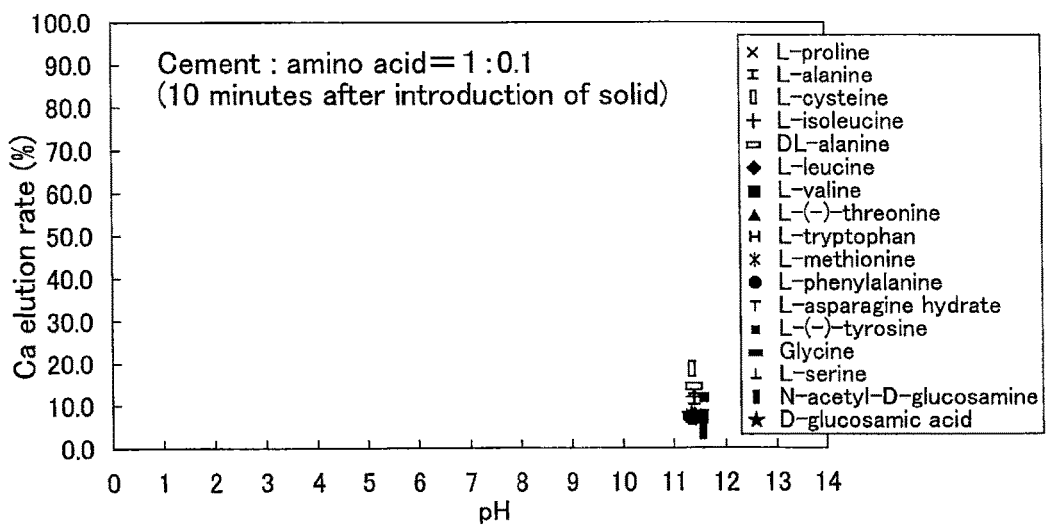
FIG. 9 is a diagram showing a relationship between the pH of a mixed aqueous solution and the rate of elution of calcium ions (the amount (mole) of substance of CaO in cement: the amount (mole) of substance of each of the various types of amino acids added=1:0.1) measured 10 minutes after introduction of a solid.

As shown in FIG. 5, the mixed aqueous solutions (molar ratio=1:0.1) immediately after introduction of cement had a wide range of pH of approximately 5 to 7, but after 10 minutes, the mixed aqueous solutions had a pH of approximately 11 to 12 as shown in FIG. 9, which is leaning toward the alkaline side.

Figure 6:
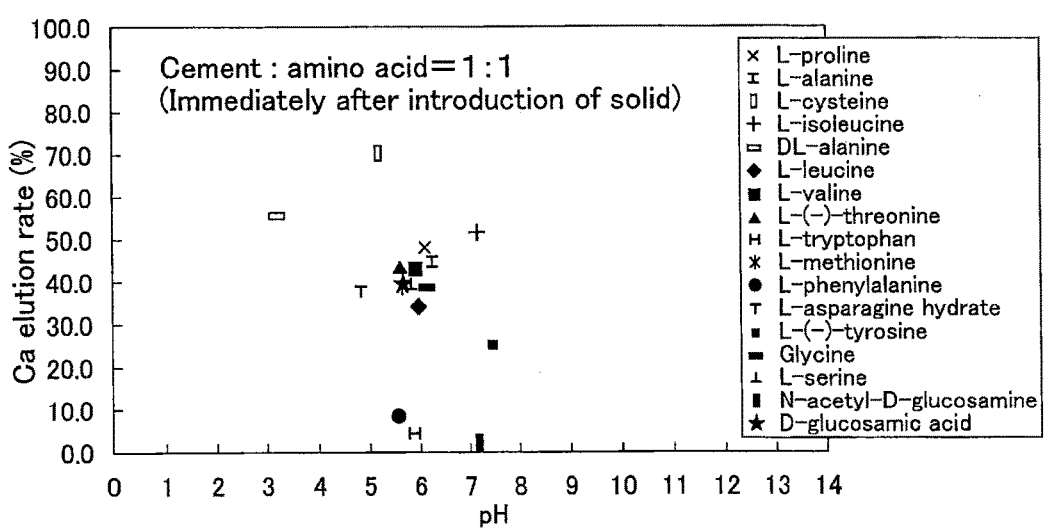
FIG. 6 is a diagram showing a relationship between the pH of a mixed aqueous solution and the rate of elution of calcium ions (the amount (mole) of substance of CaO in cement: the amount (mole) of substance of each of the various types of amino acids added=1:1) immediately after introduction of a solid.
Figure 10:
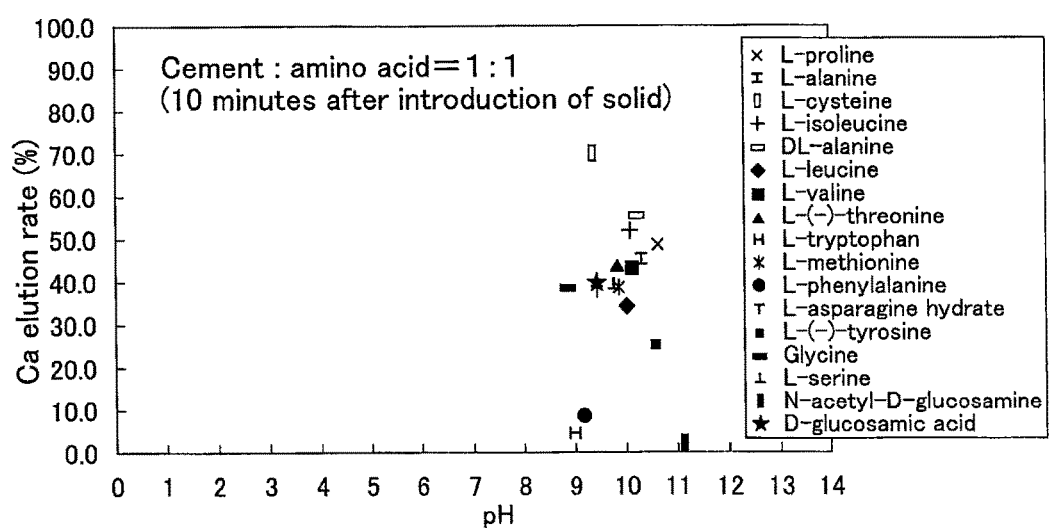
FIG. 10 is a diagram showing a relationship between the pH of a mixed aqueous solution and the rate of elution of calcium ions (the amount (mole) of substance of CaO in cement: the amount (mole) of substance of each of the various types of amino acids added=1:1) measured 10 minutes after introduction of a solid.

As shown in FIG. 6, the mixed aqueous solutions (molar ratio=1:1) immediately after introduction of cement had a wide range of pH of approximately 3 to 7, but after 10 minutes, the mixed aqueous solutions had a pH of approximately 9 to 11 as shown in FIG. 10, which is leaning toward the alkaline side.

Figure 7:
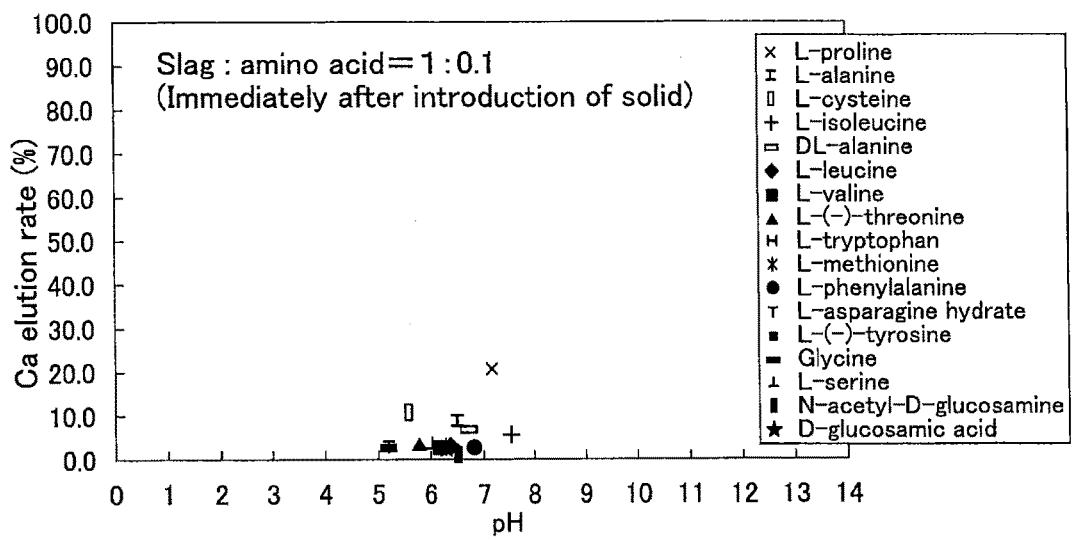
FIG. 7 is a diagram showing a relationship between the pH of a mixed aqueous solution and the rate of elution of calcium ions (the amount (mole) of substance of CaO in slag: the amount (mole) of substance of each of the various types of amino acids added=1:0.1) immediately after introduction of a solid.
Figure 11:
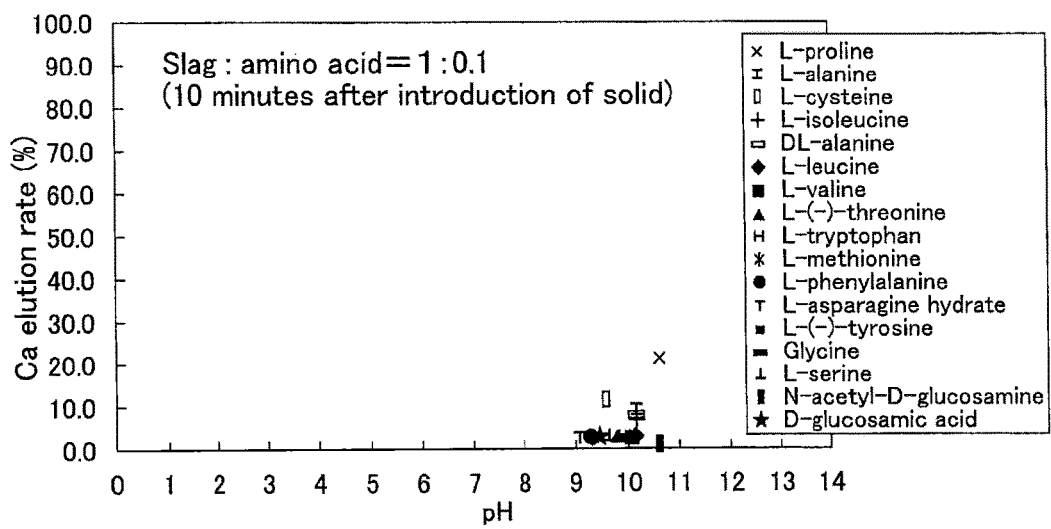
FIG. 11 is a diagram showing a relationship between the pH of a mixed aqueous solution and the rate of elution of calcium ions (the amount (mole) of substance of CaO in slag: the amount (mole) of substance of each of the various types of amino acids added=1:0.1) measured 10 minutes after introduction of a solid.

As shown in FIG. 7, the mixed aqueous solutions (molar ratio=1:0.1) immediately after introduction of slag had a wide range of pH of approximately 5 to 8, but after 10 minutes, the mixed aqueous solutions had a pH of approximately 9 to 11 as shown in FIG. 11, which is leaning toward the alkaline side.

Figure 8:
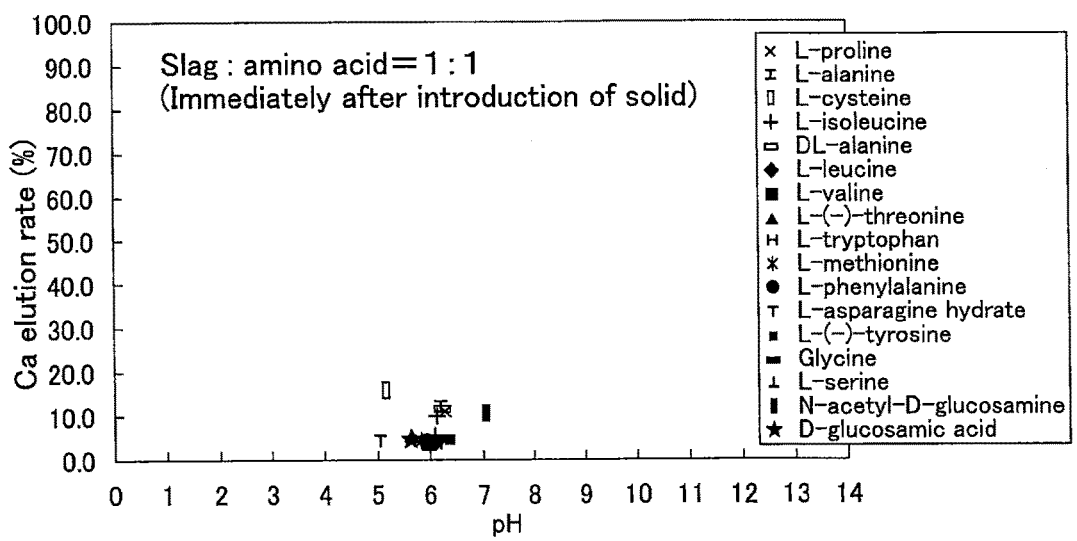
FIG. 8 is a diagram showing a relationship between the pH of a mixed aqueous solution and the rate of elution of calcium ions (the amount (mole) of substance of CaO in slag: the amount (mole) of substance of each of the various types of amino acids added=1:1) immediately after introduction of a solid.
Figure 12:
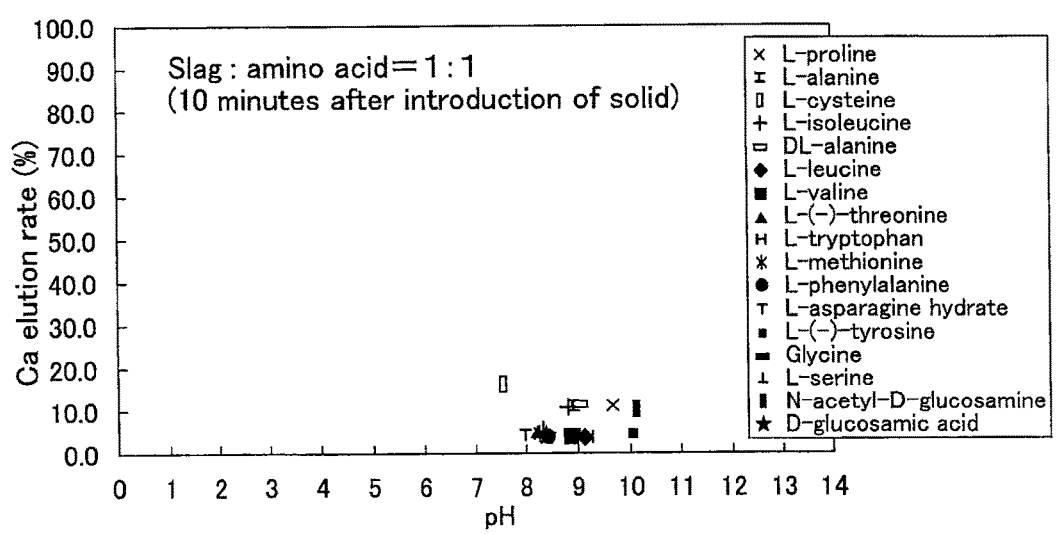
FIG. 12 is a diagram showing a relationship between the pH of a mixed aqueous solution and the rate of elution of calcium ions (the amount (mole) of substance of CaO in slag: the amount (mole) of substance of each of the various types of amino acids added=1:1) measured 10 minutes after introduction of a solid.

As shown in FIG. 8, the mixed aqueous solutions (molar ratio=1:1) immediately after introduction of slag had a wide range of pH of approximately 5 to 7, but after 10 minutes, the mixed aqueous solutions had a pH of approximately 8 to 10 as shown in FIG. 12, which is slightly shifted toward the alkaline side.

From the above, a tendency was found that all of the mixed aqueous solutions have a wide range of pH from acid to alkaline immediately after introduction of a solid, but the pH shifts toward the alkaline side over time.

A possible explanation of this tendency is as follows. The pH of a mixed aqueous solution immediately after introduction of a solid to the amino acid-containing aqueous solution is determined by the isoelectric point of the amino acid used. Accordingly, the pH of the mixed aqueous solutions containing a neutral amino acid (L-proline, L-alanine or the like) is around neutral pH, and thus a wide range of pH is exhibited as a whole according to the type of amino acid contained in each mixed aqueous solution. However, CaO contained in the solid is eluted into the mixed aqueous solution over time and turned into $Ca(OH)_2$, which is dissociated to increase hydroxide ions (OH—). For this reason, the pH becomes high, and the pH of the mixed aqueous solution shifts toward the alkaline side.

Accordingly, it was confirmed from these results that an alkali metal and/or alkali earth metal can be extracted from a solid by using an amino acid-containing aqueous solution.

The pH of a mixed aqueous solution measured 10 minutes after introduction of a solid is determined based on the point of neutralization of calcium ions eluted from the solid and the isoelectric point of the amino acid used. That is, it is considered that in each mixed aqueous solution shown in FIGS. 9 to 11, the amount (mole) of substance of calcium ions eluted was higher than the amount (mole) of substance of the amino acid, and the pH was determined mainly by the point of neutralization of calcium ions so that all of the mixed aqueous solutions were alkaline, and thus the pH range was narrow. On the other hand, in each mixed aqueous solution shown in FIG. 12, the amount (mole) of substance of the amino acid was substantially the same as or higher than the amount (mole) of substance of calcium ions eluted, and the pH was determined mainly by the isoelectric point of the amino acid used, and thus the pH range was wide.

Also, as shown in FIGS. 9 and 10, the rate of elution of calcium ions tends to be higher as the concentration of amino acid in the mixed aqueous solution increases. Also, as shown in FIGS. 11 and 12, the tendency that the rate of elution of calcium ions is higher as the concentration of amino acid in the mixed aqueous solution increases applies to the case where slag is used as the solid, except L-proline. That is, it can be seen that the rate of elution of Ca in the case of using the same type of solid is proportional to the amino acid concentration.

Also, as shown in FIGS. 5 and 9, in the case of the solid being cement, the pH range immediately after introduction of cement was approximately 5 to 7, and after 10 minutes, the pH range varied to approximately 11 to 12. On the other hand, as shown in FIGS. 7 and 11, in the case of the solid being slag, the pH range immediately after introduction of slag was approximately 5 to 8, and after 10 minutes, the pH range varied to approximately 9 to 11. In other words, in the case where the concentration of amino acid in the mixed aqueous solution is the same, the pH varies more significantly during a period immediately after introduction until 10 minutes after introduction when cement is added.

The driving force for moving a substance is proportional to the concentration of the substance, and the driving force for moving calcium ($F=-grad\mu_{Ca}$) is proportional to the concentration of calcium. In other words, the difference with respect to the initial calcium concentration in the mixed aqueous solution increases as the amount of calcium contained in the solid increases (in the present embodiment, as the initial CaO content in the solid increases), and thus the driving force for moving calcium increases.

The calcium content in cement is higher than that in slag, and thus a greater driving force acts to move calcium. As a result, calcium is more easily eluted from cement than from slag. For this reason, it is considered that the pH of the mixed aqueous solutions into which cement was introduced shifted more toward the alkaline side, and thus the pH varied significantly.

Example 2

In order to confirm whether or not the alkali metal and/or alkali earth metal extraction capability of a neutral amino acid-containing aqueous solution is maintained when the neutral amino acid-containing aqueous solution is repeatedly used, a series of processing steps including an elution step, a precipitation step and a recovery step according to the present invention was repeatedly carried out on the same neutral amino acid-containing aqueous solution by using the apparatus shown in FIG. 1, and the rate of elution of calcium ions and the rate of precipitation of calcium ions were checked in each series of processing steps.

Figure 13:
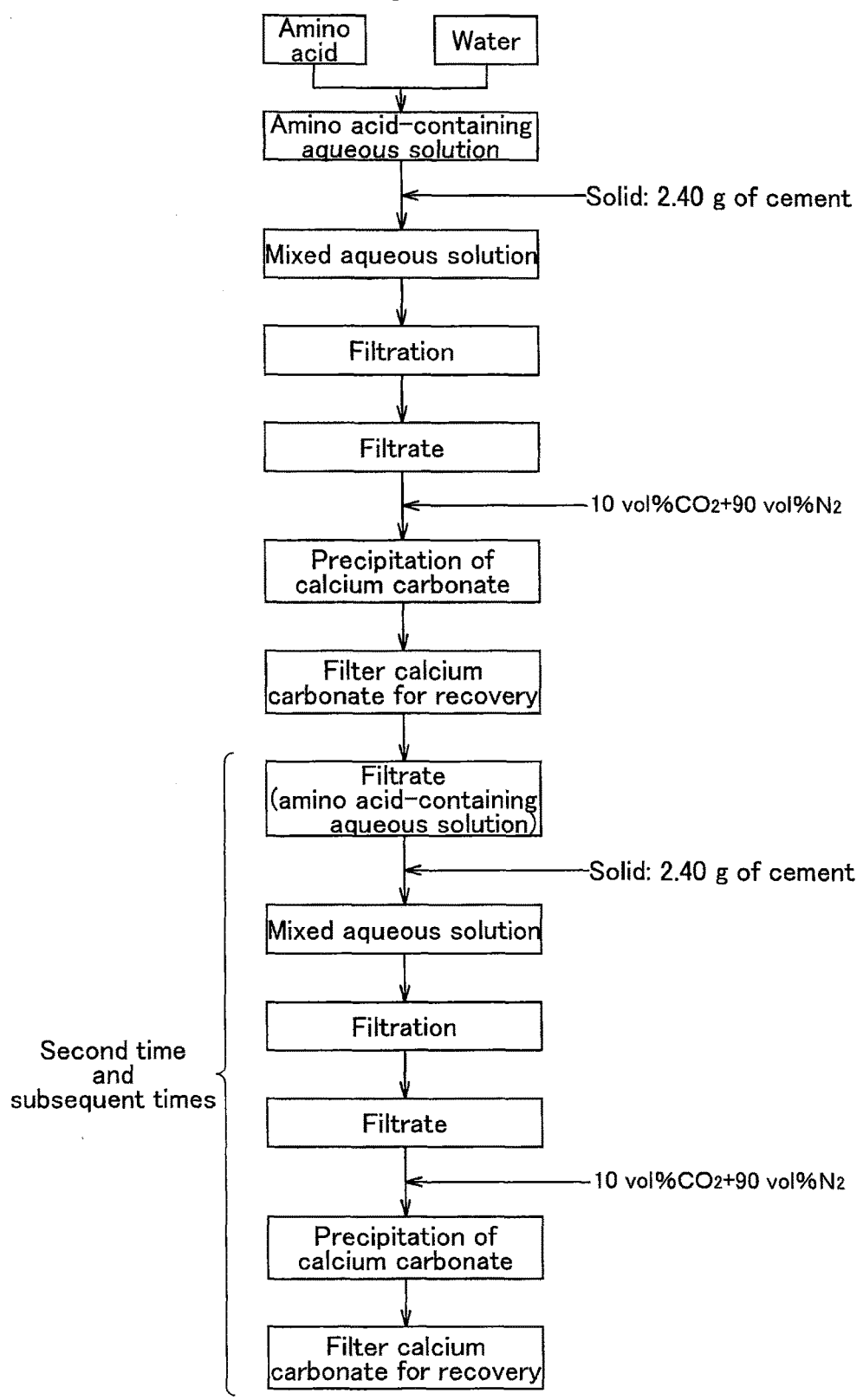
FIG. 13 is a flow diagram according to Example 2.

According to the flow shown in FIG. 13, a neutral amino acid-containing aqueous solution (100 mL) containing 2.40 g of DL-alanine as a neutral amino acid was prepared, and 2.40 g of cement (Portland cement for chemical analysis, the Japan Cement Association, 211R reference sample for chemical analysis) was added as a solid so as to prepare a mixed aqueous solution, and the resulting mixed aqueous solution was stirred for 10 minutes in the same manner as in Example 1 so as to elute calcium ions (elution step). The ratio of the number of moles of CaO in the cement to the number of moles of DL-alanine added was set to 1:1.

During the elution step, the pH, oxidation-reduction potential and temperature of the mixed aqueous solution in the reaction vessel 1 were measured by using the measuring device 7 so as to obtain the rate of elution of calcium ions (Ca elution rate).

Next, the solid residues in the mixed aqueous solution were removed through vacuum filtration so as to collect a filtrate, and a simulated combustion exhaust gas was introduced into the filtrate as an acidic gas, and then bubbled so as to precipitate calcium carbonate (precipitation step).

As the simulated combustion exhaust gas, a mixed gas of carbonic acid gas ($CO_2$) and nitrogen ($N_2$) gas was used. The simulated combustion exhaust gas was supplied by mixing carbonic acid gas and nitrogen gas at a predetermined mixing ratio by the mixing apparatus 6 while adjusting the flow rate of the carbonic acid gas and the nitrogen gas by the flow regulators 4 and 5, respectively. In this example, the simulated combustion exhaust gas having the following composition: 10 vol % $CO_2$+90 vol % $N_2$ was introduced at 1 liter per minute for 90 minutes.

Next, the precipitated calcium carbonate was recovered through vacuum filtration so as to collect a filtrate (neutral amino acid-containing aqueous solution) (recovery step). The recovered calcium carbonate was dried and weighed so as to obtain the rate of precipitation of calcium ions (Ca precipitation rate: the proportion of calcium in the calcium carbonate with respect to the amount of calcium ions eluted in the elution step).

Next, as another solid, 2.40 g of cement was again added to the collected filtrate (neutral amino acid-containing aqueous solution), and a series of processing steps including a second elution step, a second precipitation step and a second recovery step were carried out in the same manner as described above. In this example, a series of processing steps including an elution step, a precipitation step and a recovery step was repeatedly carried out 5 times on the same neutral amino acid-containing aqueous solution.

Figure 14:
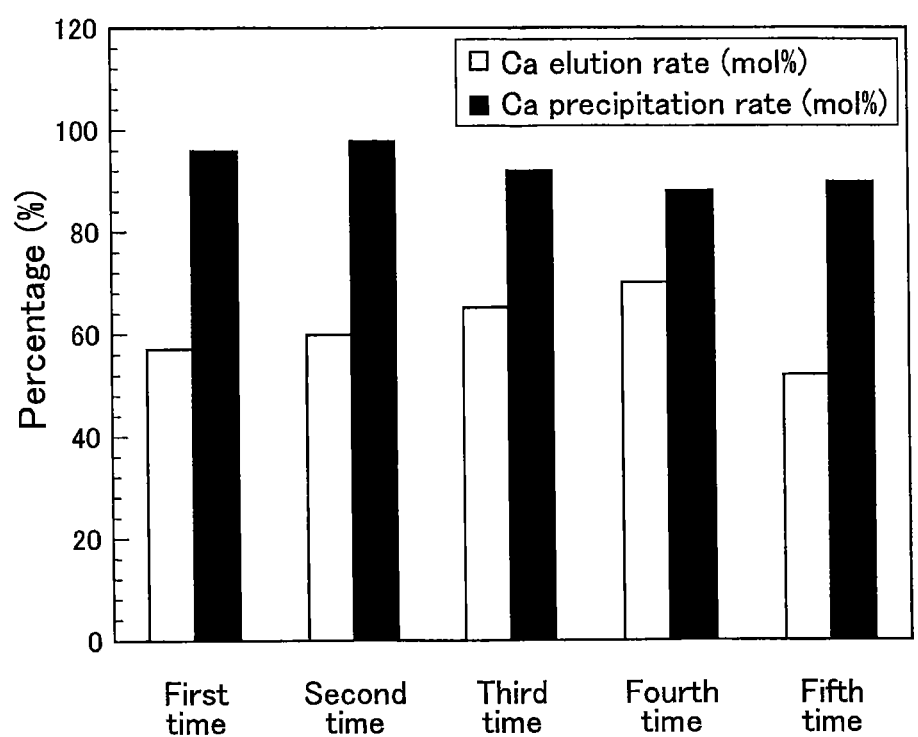
FIG. 14 is a graph showing the rate (mol %) of elution of calcium ions and the rate (mol %) of precipitation of calcium ions obtained when an amino acid-containing aqueous solution according to Example 2 was repeatedly used.

FIG. 14 shows the rate of elution of calcium ions (Ca elution rate) and the rate of precipitation of calcium ions (Ca precipitation rate) that were obtained in each series of processing steps. As shown in FIG. 14, no significant reduction in the Ca elution rate was observed even when the same amino acid-containing aqueous solution was used repeatedly at least 5 times although there were some variations. Accordingly, it was confirmed that the neutral amino acid-containing aqueous solution can be used repeatedly as a catalyst for precipitating a carbonate from a solid.

Example 3

Examples 1 and 2 have confirmed that an alkali metal and/or alkali earth metal is eluted from a solid in proportion to the amino acid concentration by using a neutral amino acid as a catalyst, and the neutral amino acid can be repeatedly used. This example is performed so as to confirm that amino acids having an isoelectric point within a range of ±1.5 with respect to the first acid dissociation constant of the acidic gas (pKa1) are superior to other amino acids in terms of the amount of alkali metal and/or alkali earth metal eluted from a solid prior to a precipitation step of precipitating a salt.

In this example, amino acid-containing aqueous solutions (100 mL) were prepared using each of various types of amino acids, the amino acid-containing aqueous solutions containing amino acids (L-cysteine, L-alanine, DL-alanine, L-proline and glycine) having an isoelectric point within a range of ±1.5 with respect to the first acid dissociation constant of the carbonic acid gas, and amino acid-containing aqueous solutions containing other amino acids (L-aspartic acid, L-glutamic acid and L-arginine). Next, the ratio of the amount (mole) of substance of CaO contained in each of cement and slag and the amount (mole) of substance of each of the various types of amino acids was set to 1:1, and the concentration (mol/L) of Ca eluted in the mixed aqueous solution was measured 10 minutes after introduction of the solid in the elution step performed in the same manner as in Example 1.

Figure 16:
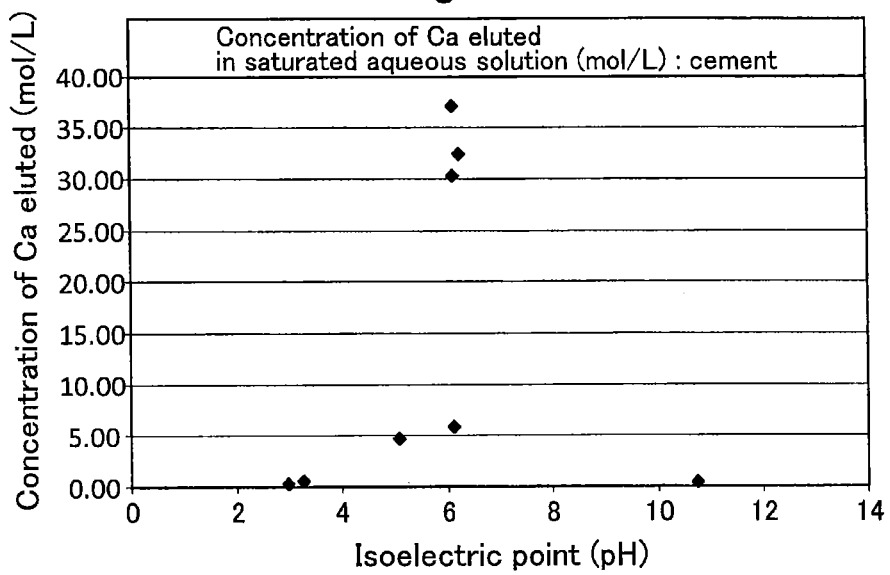
FIG. 16 is a diagram showing a relationship between the isoelectric point of an amino acid and the amount (moVL) of elution of calcium ions according to Example 3.
Figure 17:
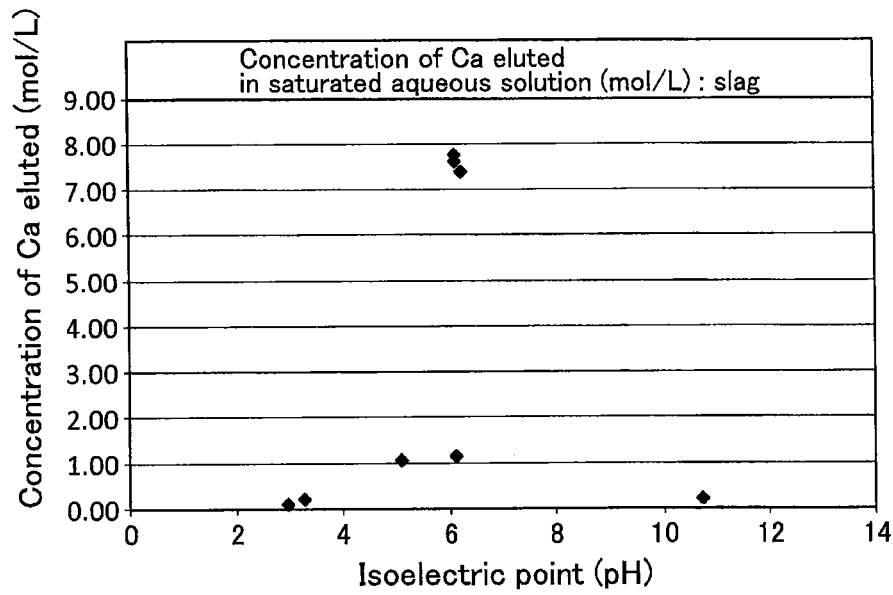
FIG. 17 is a diagram showing a relationship between the isoelectric point of an amino acid and the amount (moVL) of elution of calcium ions according to Example 3.

The measured concentration (mol/L) of eluted Ca was converted to the saturated solubility of the amino acid used (the amount of substance of amino acid when saturated with respect to 1 L of water) (FIG. 15), and the relationship between the isoelectric point (pH) of the amino acid and the amount (moVL) of elution of calcium ions was plotted (FIGS. 16 and 17). As shown in FIG. 16, in the case of the solid being cement, it can be seen that the use of amino acids having an isoelectric point (roughly at a pH of 4 to 8) near the first acid dissociation constant (pKa1=6.35) of the carbonic acid gas provided a higher amount of elution of calcium ions as compared to the use of other amino acids. On the other hand, on the acid side or the alkaline side with respect to a pH of 4 to 8, the amount of elution of calcium ions was small. Also, as shown in FIG. 17, a similar tendency was observed in the case of the solid being slag.

This is because the saturated solubility of amino acid having an isoelectric point near neutral pH tends to be higher than that of acidic amino acid or basic amino acid. That is, even when the rate of elution of calcium ions is small, if the saturated solubility of amino acid that can be dissolved in the amino acid-containing aqueous solution is high, the absolute value of the amount of elution of calcium ions becomes high. Accordingly, if the neutral amino acid-containing aqueous solution or the like is brought into contact with carbonic acid gas in the subsequent precipitation step, the amount of salt precipitated increases in proportion to the amount of calcium ions eluted. Furthermore, the range of the buffer capacity of amino acid having an isoelectric point near neutral pH overlaps the range of ±1.5 with respect to the first acid dissociation constant of the carbonic acid gas, and thus the precipitation of salt and the separation and restoration of amino acid are promoted. Accordingly, as a result of the isoelectric point of the amino acid-containing aqueous solution falling within a range of ±1.5 with respect to the first acid dissociation constant of the carbonic acid gas, the increase in the amount of consumption of carbon dioxide can be achieved together with the reduction of solid residues.

As described above, it was configured that the alkali metal and/or alkali earth metal extraction efficiency can be increased with the use of a neutral amino acid-containing aqueous solution or the like. On the other hand, the amount of amino acid that can be dissolved per liter of water is a value unique to each of the various types of amino acids, and thus the amino acid concentration cannot be increased without limitation. For this reason, if the amount of water is excessively increased to increase the amount of amino acid, the apparatus becomes large in size. Conversely, the amount of solid introduced may be reduced, but this is inefficient to recover an alkali metal and/or alkali earth metal from a large amount of solid.

Accordingly, it is preferable that the peak values of the rate of elution and the amount of salt precipitated are matched, or the integrated value of the rate of elution and the amount of salt precipitated is maximized by optimizing the mixing ratio of water, amino acid and the solid. Here, the reason why focus is given to the rate of elution is that the rate of elution is inversely proportional to solid residues, and the reason why focus is given to the amount of precipitation is that the amount of precipitation is proportional to the amount of consumption of greenhouse gas such as carbon dioxide in the precipitation step. The mixing ratio varies depending on the type of amino acid and the type of solid, and thus the mixing ratio is determined as appropriate when the present invention is carried out.

INDUSTRIAL APPLICABILITY

The present invention is suitably used to recover an alkali metal and/or alkali earth metal from construction waste material including concrete and industrial waste matter such as steel slag.

REFERENCE SIGNS LIST

1 Reaction Vessel
2 Stirrer
3 Water Bath
4, 5 Flow Regulator
6 Mixing Apparatus
7 Measuring Device
8 Gas Chromatograph
9 Backflow Preventing Apparatus
10 Calculator

The invention claimed is:

1. A method for extracting at least one of an alkali metal and an alkali earth metal from a solid containing at least one of the alkali metal and the alkali earth metal, the method comprising
adding the solid to a neutral amino acid-containing aqueous solution so as to elute at least one of the alkali metal and the alkali earth metal in the neutral amino acid-containing aqueous solution,
contacting an acidic gas with the eluted at least one of the alkali metal and the alkali earth metal in the neutral amino acid-containing aqueous solution to precipitate the at least one of the alkali metal and the alkali earth metal as a salt,
recovering the salt,
adding another solid containing at least one of an alkali metal and an alkali earth metal to the neutral amino acid-containing aqueous solution from which the salt was recovered to elute at least one of the alkali metal and the alkali earth metal in the neutral amino acid-containing aqueous solution, and
determining a mixing ratio of water, the neutral amino acid and the solid so that peak values of a rate of elution and an amount of the salt precipitated are matched, the rate of elution being obtained by dividing an amount of the at least one of the alkali metal and the alkali earth metal eluted in the neutral amino acid-containing aqueous solution by an amount of the at least one of the alkali metal and the alkali earth metal contained in the solid, or an integrated value of the rate of elution and the amount of the salt precipitated is maximized,
wherein the neutral amino acid-containing aqueous solution has an isoelectric point within a range of ±1.5 with respect to a first acid dissociation constant of the acidic gas, and the neutral amino acid is DL-alanine and is a chelating agent that reacts with at least one of the alkali metal and the alkali earth metal to form a chelated complex.

2. The method according to claim 1, wherein the acidic gas is carbonic acid gas.

3. The method according to claim 1, wherein the acidic gas is carbonic acid gas.

4. The method according to claim 1, wherein the at least one of an alkali metal and the alkali earth metal is calcium.

5. A method for extracting at least one of an alkali metal and an alkali earth metal from a solid containing at least one of the alkali metal and the alkali earth metal, the method comprising
adding the solid to an amino acid-containing mixed aqueous solution produced by mixing a pH adjusting agent with an aqueous solution containing at least one of a neutral amino acid, an acidic amino acid and a basic amino acid so as to elute at least one of the alkali metal and the alkali earth metal in the amino acid-containing mixed aqueous solution,
contacting an acidic gas with the eluted at least one of the alkali metal and the alkali earth metal in the amino acid-containing mixed aqueous solution to precipitate the at least one of the alkali metal and the alkali earth metal as a salt,
recovering the salt,
adding another solid containing at least one of an alkali metal and an alkali earth metal to the amino acid-containing mixed aqueous solution from which the salt was recovered to elute at least one of the alkali metal and the alkali earth metal in the amino acid-containing mixed aqueous solution, and determining a mixing ratio of water, the at least one of the neutral amino acid, the acidic amino acid and the basic amino acid, and the solid, so that peak values of a rate of elution and an amount of the salt precipitated are matched, the rate of elution being obtained by dividing an amount of the at least one of the alkali metal and the alkali earth metal eluted in the amino acid-containing mixed aqueous solution by an amount of the at least one of the alkali metal and the alkali earth metal contained in the solid, or an integrated value of the rate of elution and the amount of the salt precipitated is maximized, wherein the amino acid-containing mixed aqueous solution has an isoelectric point within a range of ±1.5 with respect to a first acid dissociation constant of the acidic gas, and the amino acid is an organic compound which has both an amino group and a hydroxyl group and is a chelating agent that reacts with at least one of the alkali metal and the alkali earth metal to form a chelated complex, and the amino acid comprises DL-alanine.

6. The method according to claim 5, wherein the acidic gas is carbonic acid gas.

* * * * *